United States Patent [19]

Siddall

[11] 3,888,893
[45] June 10, 1975

[54] UNSATURATED AMIDES

[76] Inventor: John B. Siddall, 2470 Greer St., Palo Alto, Calif. 94303

[22] Filed: Feb. 16, 1973

[21] Appl. No.: 333,260

Related U.S. Application Data

[60] Division of Ser. No. 153,074, June 14, 1971, Pat. No. 3,755,356, which is a continuation-in-part of Ser. Nos. 860,086, Sept. 22, 1969, abandoned, and Ser. No. 874,678, Nov. 6, 1969, Pat. No. 3,631,080.

[52] U.S. Cl. .............................................. 260/404
[51] Int. Cl. ......................................... C07c 103/30
[58] Field of Search .................................... 260/404

[56] References Cited
UNITED STATES PATENTS 2,435,829  2/1948  Guest .................................. 260/404
3,281,438  10/1966  Johnson .............................. 260/404

*Primary Examiner*—Lewis Gotts
*Assistant Examiner*—Ethel G. Love

[57] ABSTRACT

Unsaturated amides of the formula

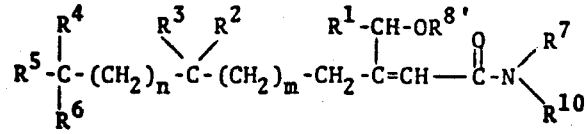

having utility as insect control agents and as intermediates for lactams.

9 Claims, No Drawings

UNSATURATED AMIDES

CROSS REFERENCE

This is a division of Ser. No. 153,074, filed June 14, 1971, now U.S. Pat. No. 3,755,356, which is a continuation-in-part of Ser. No. 860,086, filed Sept. 22, 1969, now abandoned, and Ser. No. 874,678, filed Nov. 6, 1969, now U.S. Pat. No. 3,631,080.

INCORPORATION BY REFERENCE

Reference is hereby made to U.S. Pat. No. 3,755,356. All description therein is incorporated herein by reference.

SUMMARY OF INVENTION

Unsaturated amides of the formula $$R^5-\underset{\underset{R^6}{|}}{\overset{\overset{R^4}{|}}{C}}-(CH_2)_n-\underset{}{\overset{R^3}{\underset{}{C}}}\diagdown\diagup\overset{R^2}{}-(CH_2)_m-CH_2-\underset{\underset{}{|}}{\overset{R^1-CH-OR^{8'}}{C}}=CH-\underset{}{\overset{O}{\overset{\|}{C}}}-N\diagdown^{R^7}_{R^{10}}$$

wherein, $m$ is zero or the positive integer one to five, $n$ is the positive integer two to six, each of $R^1$, $R^2$, $R^6$, $R^7$ and $R^{10}$ is hydrogen or lower alkyl, each of $R^3$, $R^4$ and $R^5$ is lower alkyl, and $R^{8'}$ is hydrogen, tetrahydropyran-2'-yl or tetrahydrofuran-2'-yl. The amides are useful for the control of insects and as intermediates for crotonic amide γ-lactams.

I claim:

1. A compound selected from those of the following formula:

$$R^5-\underset{\underset{R^6}{|}}{\overset{\overset{R^4}{|}}{C}}-(CH_2)_n-\underset{}{\overset{R^3}{\underset{}{C}}}\diagdown\diagup\overset{R^2}{}-(CH_2)_m-CH_2-\underset{\underset{}{|}}{\overset{R^1-CH-OR^{8'}}{C}}=CH-\underset{}{\overset{O}{\overset{\|}{C}}}-N\diagdown^{R^7}_{R^{10}}$$

wherein,
  $m$ is zero or the positive integer one to five;
  $n$ is the positive integer two to six;
  each of $R^1$, $R^2$, $R^6$, $R^7$ and $R^{10}$ is hydrogen or lower alkyl;
  $R^8$ is hydrogen, and
  each of $R^3$, $R^4$ and $R^5$ is lower alkyl.

2. A compound according to claim 1 wherein $R^1$ is hydrogen or methyl; $R^2$ is hydrogen; $m$ is zero, one or two; $n$ is two, three or four; each of $R^3$, $R^4$ and $R^5$ is methyl or ethyl; $R^6$ is hydrogen, methyl or ethyl and each of $R^7$ and $R^{10}$ is hydrogen or lower alkyl of one to three carbon atoms.

3. A compound according to claim 2 wherein each of $R^3$, $R^4$ and $R^5$ is methyl and $R^6$ is hydrogen.

4. A compound according to claim 3 wherein $m$ is zero and $n$ is two.

5. A compound according to claim 4 wherein $R^7$ is ethyl and $R^{10}$ is hydrogen.

6. A compound according to claim 3 wherein $m$ is one and $n$ is three.

7. A compound according to claim 6 wherein $R^7$ is ethyl and $R^{10}$ is hydrogen.

8. A compound according to claim 2 wherein $m$ is zero; $n$ is two; each of $R^3$, $R^4$ and $R^5$ is methyl; $R^6$ is hydrogen; and each of $R^7$ and $R^{10}$ is hydrogen, methyl or ethyl.

9. A compound according to claim 2 wherein $R^6$ is hydrogen; $m$ is one; $n$ is three; each of $R^3$, $R^4$ and $R^5$ is methyl and each of $R^7$ and $R^{10}$ is hydrogen, methyl or ethyl.

* * * * *